US011037351B2

United States Patent
Hall et al.

(10) Patent No.: US 11,037,351 B2
(45) Date of Patent: Jun. 15, 2021

(54) SYSTEM AND METHOD FOR DIRECTED STORYLINE CUSTOMIZATION

(71) Applicants: Bram Hall, Charlotte, NC (US); Dan Driscoll, Charlotte, NC (US)

(72) Inventors: Bram Hall, Charlotte, NC (US); Dan Driscoll, Charlotte, NC (US)

( * ) Notice: Subject to any disclaimer, the term of this patent is extended or adjusted under 35 U.S.C. 154(b) by 132 days.

(21) Appl. No.: 16/220,903

(22) Filed: Dec. 14, 2018

(65) Prior Publication Data
US 2020/0143574 A1 May 7, 2020

Related U.S. Application Data

(60) Provisional application No. 62/609,912, filed on Dec. 22, 2017.

(51) Int. Cl.
*G06F 17/00* (2019.01)
*G06F 3/00* (2006.01)
*G06T 11/60* (2006.01)
*G06N 3/08* (2006.01)
*H04L 29/08* (2006.01)

(52) U.S. Cl.
CPC ............... *G06T 11/60* (2013.01); *G06N 3/08* (2013.01); *H04L 67/06* (2013.01)

(58) Field of Classification Search
CPC ......... G06F 40/106; G06T 11/60; G06N 3/08; G06Q 10/10
USPC ........................................ 715/202, 200, 731
See application file for complete search history.

(56) References Cited

U.S. PATENT DOCUMENTS

| 7,890,534 | B2* | 2/2011 | Bathiche | G06F 40/131 |
| | | | | 707/791 |
| 8,526,728 | B2* | 9/2013 | Kang | G06T 5/00 |
| | | | | 382/167 |
| 8,806,331 | B2* | 8/2014 | Grosz | G06F 3/14 |
| | | | | 715/243 |
| 8,919,819 | B2* | 12/2014 | Shade | B42D 1/009 |
| | | | | 283/68 |
| 8,923,551 | B1* | 12/2014 | Grosz | H04N 1/00196 |
| | | | | 382/100 |
| 9,081,484 | B2* | 7/2015 | Han | G11B 27/034 |
| 2002/0070982 | A1* | 6/2002 | Hill | G06F 3/0483 |
| | | | | 715/835 |
| 2011/0211753 | A1* | 9/2011 | Lee | H04N 1/00196 |
| | | | | 382/164 |
| 2012/0066573 | A1* | 3/2012 | Berger | H04N 1/00196 |
| | | | | 715/202 |

(Continued)

*Primary Examiner* — Manglesh M Patel
(74) *Attorney, Agent, or Firm* — John L. Sotomayor

(57) ABSTRACT

The present invention is a system and method for dynamic directed customization of a pre-existing storyline. The innovation synthesizes the Print-on-Demand (POD) personalized print and the POD photo book in order to capitalize on their inherent symmetrical synergies. In an embodiment, a user would access a proprietary digital application via a digital device controlled by the user. User may select a pre-authored storyline from a catalogue of storylines. The application may prompt the user to upload a photograph from the user's device-borne photo album, directing user to upload a photograph with the necessary thematic elements for the storyline. Alternatively, the application may direct the user to take anew photographs corresponding to the written prompts. The user would be prompted to purchase a completed book including the customized storyline.

15 Claims, 8 Drawing Sheets

(56) References Cited

U.S. PATENT DOCUMENTS

| | | | |
|---|---|---|---|
| 2012/0117473 A1* | 5/2012 | Han | G06F 3/0483 |
| | | | 715/723 |
| 2015/0312649 A1* | 10/2015 | Gopalan | H04N 21/458 |
| | | | 725/32 |
| 2017/0272818 A1* | 9/2017 | Gattis | H04N 21/4415 |
| 2020/0334463 A1* | 10/2020 | Shapira | G06K 9/00671 |
| 2021/0056407 A1* | 2/2021 | Buesser | G06F 16/735 |

* cited by examiner

SYSTEM AND METHOD FOR DIRECTED STORYLINE CUSTOMIZATION

CLAIM TO PRIORITY

This Non-Provisional application claims under 35 U.S.C. § 120, the benefit of the Provisional Application 62/609,912, filed Dec. 22, 2017, Titled "System and Method for Directed Storyline Customization", which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Although storytelling is an art as old as man, the conveyance and publishing of stories, whether for adults or children, or whether told with text or pictures, has been a discipline marked by periodic breakthroughs. From the advent of the Gutenberg Bible to the development of offset printing, technological change has made possible mass communication of topics of both widespread and niche interest. With the advent of Print-on-Demand (POD) technologies and services, consumers of physical books can enjoy some of the low-cost benefits of traditional mass publishing while ensuring that their perhaps unique niche interests are not obscured by the demands of a more mainstream audience.

POD technology also offers publishers the opportunity for "micro-customization" of books based upon a template. POD has existed for several years and storytellers have begun to leverage it in a number of ways. For instance, some publishers may choose to offer a book product that is mostly composed of a generic storyline, but that leaves a small amount of text to be customized based upon input from the intended reader. Common examples may take the form of children's picture books, in which the young reader's name has been substituted for a generic placeholder name that may have less personal resonance for the reader. In such a way, a reader may feel a heightened sense of engagement with the story's protagonist.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
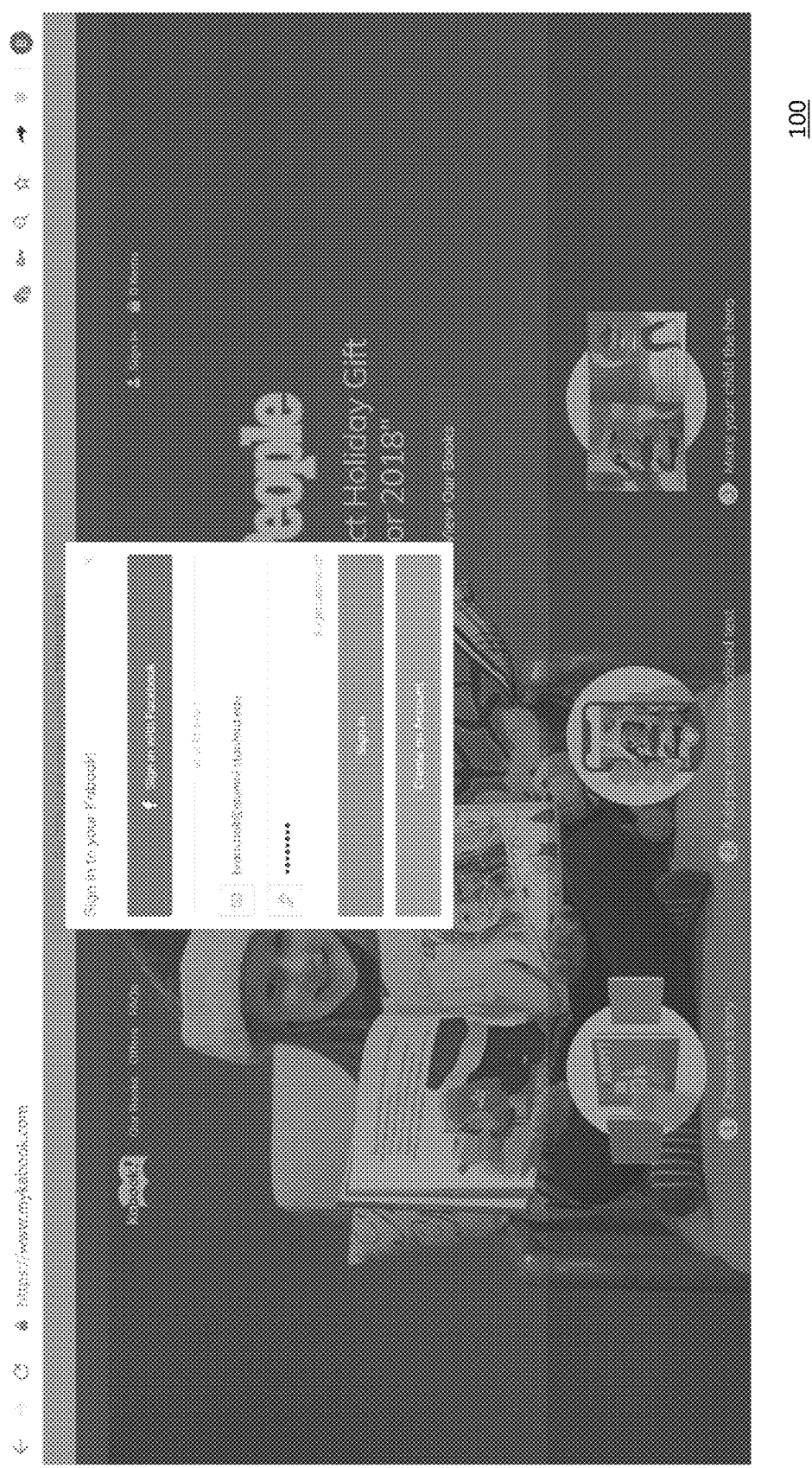
FIG. 1 is a view of the application user interface sign-in display consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "device" refers to any electronic communication device with network access such as, but not limited to, a cell phone, smart phone, tablet, iPad, networked computer, internet computer, laptop, watch or any other device, including Internet of Things devices, a user may use to interact with one or more networks.

However, unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The processes and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Reference herein to "book" refers to any published material, whether published in tangible or digital form, that has as its primary purpose the communication or conveyance of a storyline from one human individual or group of human individuals to another individual human, or to a discrete group of humans.

Books that offer the potential for customization, sometimes referred to as "personalized prints," allow a reader another avenue to full immersion in a story. Simply by substituting the reader's name for the protagonist's, an author may be able to more directly connect with his or her readers, heightening the emotional impact of any given storyline. Such customization has become possible and increasingly available through Print-on-Demand (POD) technologies and services, and has satisfied a niche market for unique gifts—ones that make the recipient the sole person to whom a particular individualized gift is appropriately given.

Prior to the instant disclosure, known as Kabook™, no technology tool has existed that can seamlessly incorporate entire photographs into pre-existing storylines to create novel adventures that combine personalized text with the visual appeal of those photographs. This new level of dual-customization strengthens the satisfaction felt by the reader. The purchaser and anyone involved in taking the photographs participates in a transformative way to memorialize experiences. The platform also opens up a new dimension of creativity for authors and illustrators. It provides them with powerful, previously nonexistent, tools to forge emotional connections with readers and may empower them to create storylines which could not have existed through previous storytelling mechanisms. As described in the remainder of this application, this new technology may also integrate augmented reality into the creation process; and may also create a new author platform that enables public demand to determine the success of any individual story.

Personalization of a book not only heightens the reader's emotional commitment to a book, but it empowers the giver of the book to express his or her own affection for the reader. Indeed, one source of the power of personalization is its ability to create meaningful connections not just between the reader and a story's characters, but between a giver and a recipient of a personalized gift.

In a non-limiting embodiment, the system and method herein described may provide new tools for authors and illustrators to connect with an audience and break the fourth wall in ways that heretofore were not available to them. In a non-limiting example, a writer may author a story searching for a child to save a medieval kingdom, showing a photograph processed and converted in accordance with the process recited herein of a child on a "wanted" poster. This "wanted" poster may call out to the child using his/her name and using the name of the child's favorite stuffed animal, augmenting in a unique and novel way the child's emotional connection to the book.

Therefore, a need exists for a system and method to synthesize the POD personalized print and the POD photo book in order to capitalize on their inherent symmetry. The innovation herein described is a system and method for dynamic directed customization of a pre-existing storyline.

In an embodiment, a user would access a proprietary digital application via a digital device controlled by the user. The digital application may be in constant or sporadic communication with a central server or website hosted by or on one or more servers. At a minimum, the application must be able to receive storyline and fulfillment options from the one or more servers, and the one or more servers must be able to receive user preferences.

The user in an embodiment may select a pre-authored storyline from a menu of storylines arranged, in a non-limiting example, by genre. Each selected storyline would be composed of a series of place-holder photographs and text that correspond to the action or scene shown in each place-holder photograph. By way of non-limiting example, a single place-holder photograph may show a girl looking out a frosted window on a winter's day, to be paired with the text, "So much snow fell yesterday, [X] is stuck inside today," where the character [X] represents a customizable data field intended to hold a reader's name. Each place-holder photograph may take the form of an actual photograph or illustration, or may instead take the form of a text prompt, such as "girl looking out of window on winter's day."

In an embodiment, the application may prompt the user to upload a photograph from the user's device-borne photo album. Such a prompt would include thematic elements necessary for any particular photograph to integrate into the pre-determined storyline. By way of non-limiting example, the prompt may read, "Upload a photograph of a girl looking out of a window on a winter's day." In an exemplary embodiment, the particular storyline chosen may require few photographs to be uploaded, as few as a single photograph, to provide a user with a quick result in terms of the creation of a customized storybook as either a proof of concept or a time sensitive result. This embodiment would offer a short (e.g.: two-minute) experience with a minimum number of photos to be taken and uploaded.

In an alternate embodiment, the application may encourage the user to make the collation of necessary photographs into a game, by directing the user to take new photographs corresponding to the written prompts provided to the user by the system. Such prompts can elevate the latent "scavenger hunt" qualities inherent in collecting photographs. Similarly, such prompts can serve as sparks for an impromptu game of dress-up, making fun for all parties to the process. This embodiment promises the opportunity for longer story experiences with a larger number of photos to be composed, taken, and uploaded. This latter option may provide an experience for a parent and child that takes place over a longer span of time and may be a shared project.

Once uploaded, photographic images in an embodiment may be altered to appear to be illustrations such as having been drawn by the human hand, or as having been painted in the style of Old Masters. The application may prompt a user to add his or her own personalized text before accepting the altered image and text as being complete. Upon completing and accepting all images, each user may view the completed story prior to ordering a print book. If the user wishes to purchase the storybook completed and presented in review format, the user would be prompted to purchase a completed book including the personalized and customized storyline. In an embodiment, upon the purchase of a customized storybook, the user may also be presented with an option of having a digital book sent to the user when a print book is ordered.

In an embodiment, the application may include an Augmented Reality (AR) component for activation with a display device for viewing the book. The AR component may include illustrations, avatars, games, or other elements that are presented to a user on the screen of a display device when the display device is focused on a page of the customized storybook. Likewise, animated Graphic Information Files (GIFs) or videos may be released with a book in an additional AR or Virtual Reality (VR) experience.

In an alternate embodiment, the application may include the option for inclusion of crowd-sourced material. As a non-limiting example, users could create and submit a particular type of story experience, storyline and customizable directions using a template provided by the storybook server for such crowd-sourced material. The resulting storyline and customizable directions may then be included in the catalogue of storybook experiences available for purchase. The application may then provide that particular story to other users in the same manner as any other selection from the storybook catalogue.

In an embodiment, a user may open a storyline template and follow a script which includes directions on what photo subjects should be uploaded. The user then would take one or more context-suitable photos and upload them to the Kabook™ system. The system to which the photos are uploaded differentiates a foreground image separately from a background image. Each image may be afforded a unique, different perspective.

In an embodiment, the system may produce books directly from a library of content, a proprietary user profile, or proprietary or public lists of children's names. In a non-limiting example, in partnership with a school yearbook company an entire set of books may be prepared utilizing lists of names associated with particular educational institutions for occasions important to the students of each particular educational institution. The system may then build custom stories without user interaction, but prepared for each user associated with said educational institution and/or occasion to be commemorated. The system may extend the creation of such sets of books to any organization or institution that may wish to create such personalized books for their users and/or members. Such stories could then be made available to the educational institution or other organization for purchase by users, members, or other interested parties, such as, in a non-limiting example, the guardians of minor children.

In an embodiment, the system may offer a gender-neutral selection of stories to users. Current gender-neutral stories are limited in selection, primarily owing to the currently smaller size of the addressable market for such gender-neutral stories. Kabook™ would be the first company to customize a story to create a gender-neutral offering of a mainstream product for customers desiring such an offering.

For certain photographic filters, the system applies different filters and different opacities to achieve an illustration effect on the foreground and the background images of an intended illustration. The foreground and background images are then composited together to create a final image that appears to be an illustration rather than a mere photograph. The system may apply up to four layer of filtering to achieve the illustration effect required for a final book. The system then transfers the illustration image to the book compositing module. An active neural network is implemented to learn what certain segments of customers or certain groups may prefer and provide that layer of filtering as an initial layering.

The compositing module comprises four compositing tasks: Preparing the background, Incorporating the filtered user image, Applying a transparency mask and Adding text. All text is customizable. In an embodiment, the instant innovation may be used to creating multiple illustration images per book page. The instant innovation may be used to segment user-uploaded images vertically, horizontally, or in some other fashion, then splice such image segments throughout the book to create compositions comprising aspects from multiple user-uploaded images. In an alternative embodiment, user-uploaded images may also be sliced or cropped to create images having simpler or less complex imagery in support of portions of a selected storyline.

Additional embodiments may include taking pictures uploaded from a phone, improving framing of mobile-phone originated photos, and collecting user feedback regarding the delivered book from a mobile device.

In an embodiment, the image may include an augmented reality view. Dynamic filters of varying opacity may be defined in real time based upon user selection and the system may provide immediate feedback of the image effect of a particular filter choice.

Turning now to FIG. 1, a view of the application user interface sign-in display consistent with certain embodiments of the present invention is shown. In an embodiment, User is prompted for log-in credentials in order to access an existing user account. User account creation permits user to collate, archive, edit, modify, and purchase user account submissions including but not limited to uploaded images, customized text, and customized storylines. Access to user account is granted through gatekeeper interface at 100.

Figure 2:
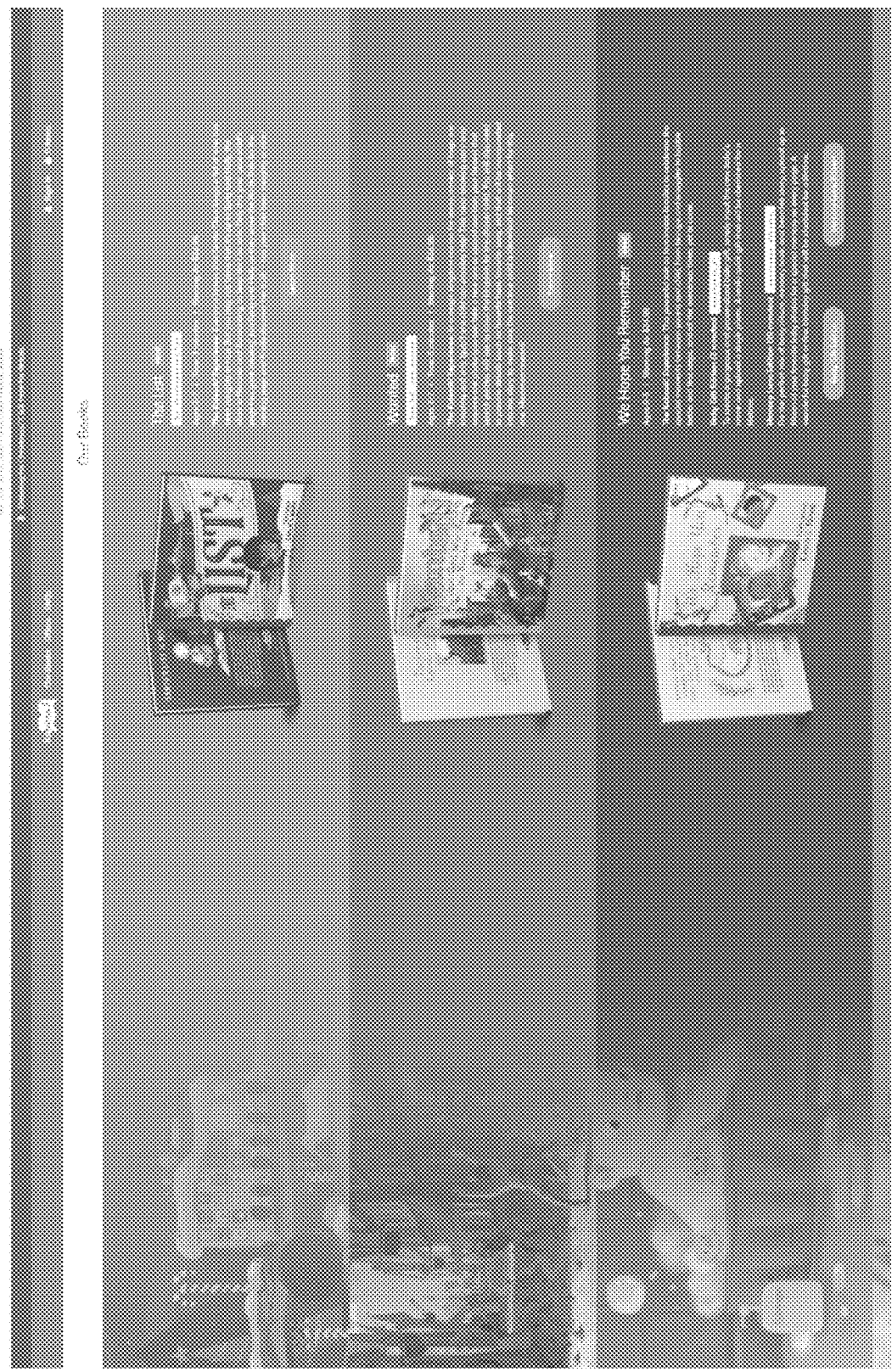
FIG. 2 is a view of the initial user-selectable storyline display consistent with certain embodiments of the present invention.

Turning now to FIG. 2, a view of the initial user-selected storyline display consistent with certain embodiments of the present invention is shown. In an embodiment, a user is presented with one or more pre-authored storylines. Such pre-authored storylines may have fields for variable user input to accommodate, by way of non-limiting example, individual names and/or unique scenarios and/or unique settings. At 200 the user may confirm selection of pre-authored storyline for further customization.

Figure 3:
FIG. 3 is a view of the application user interface functionality consistent with certain embodiments of the present invention.

Turning now to FIG. 3, a view of the application user interface functionality consistent with certain embodiments of the present invention is shown. In an embodiment, User at 300 is presented with a preview of each page of illustration and text as the same would appear in book form. At 300 User is shown placeholder photographs or text prompts calling for the types of themes to be represented graphically in the pre-authored story. For instance, a placeholder photograph may show a family sitting around a formal table. User is prompted to select his or her own unique photographs for upload that can serve as images for a customized book.

Figure 4A:
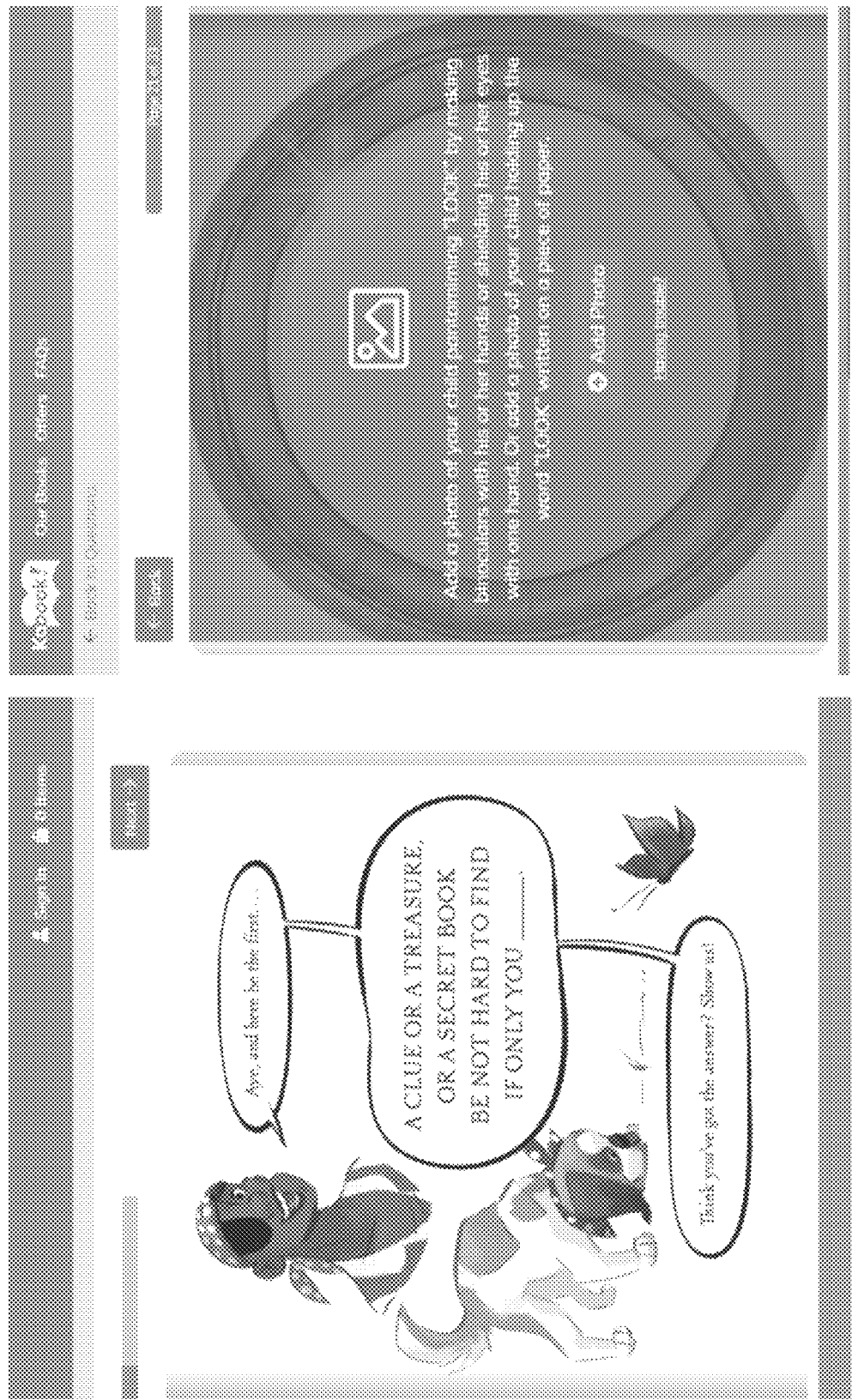
FIG. 4A is a view of the application user interface design and functionality for image selection consistent with certain embodiments of the present invention.

Turning now to FIG. 4A, a view of the application user interface design and functionality for image selection consistent with certain embodiments of the present invention is shown. In an embodiment, User is offered a game-like experience akin to a scavenger hunt by application prompts to take anew photograph images corresponding to text or image prompts at 401. The "gamification" of the process can add a heightened level of intimacy to the customized product.

Figure 4B:
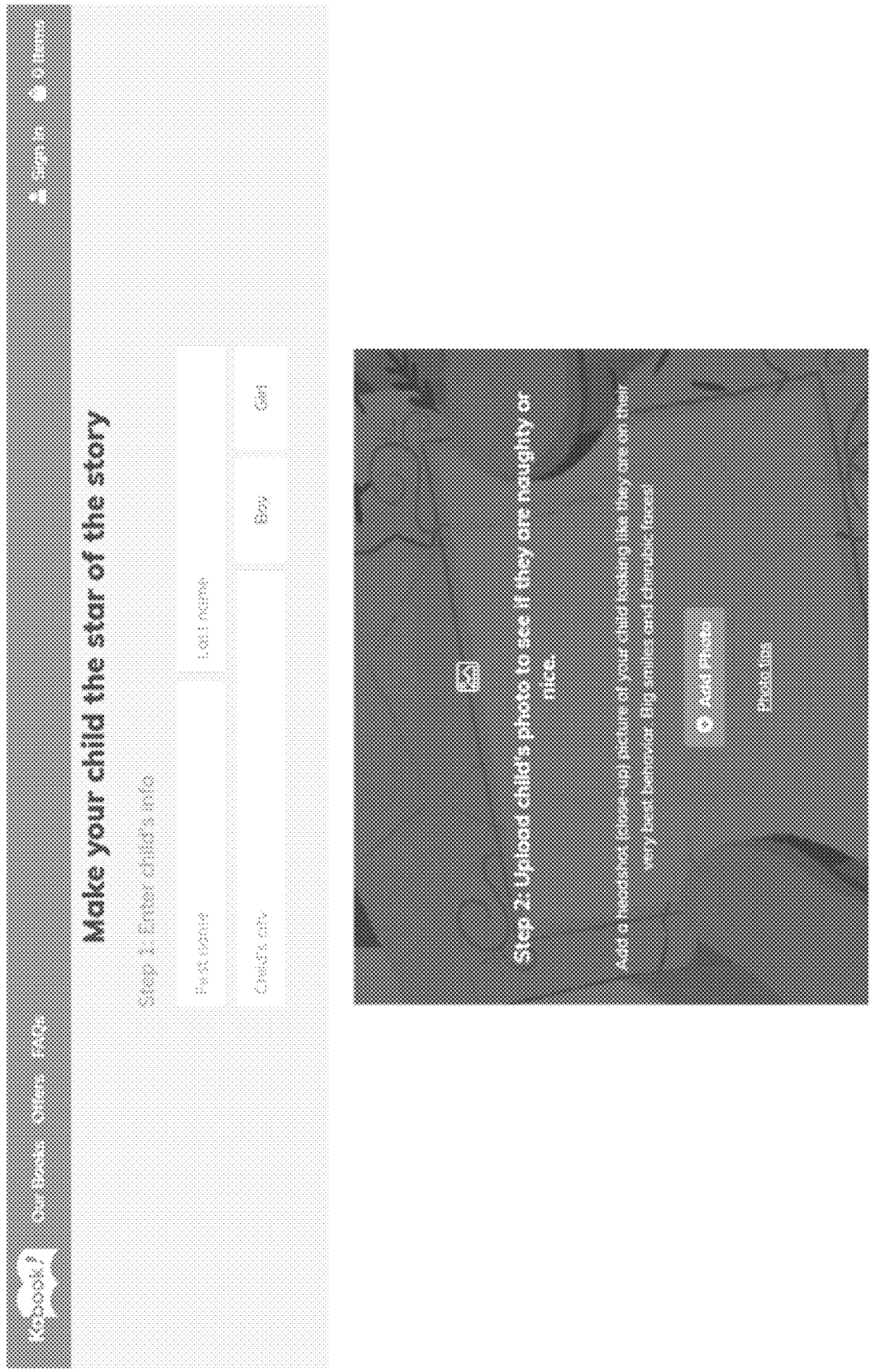
FIG. 4B is a view of the application user interface design and functionality for image upload consistent with certain embodiments of the present invention.

Turning now to FIG. 4B, a view of the application user interface design and functionality for image upload consistent with certain embodiments of the present invention is shown. In an embodiment, at 402 User is prompted to upload the photographic images to the application that are to be used within the selected story for integration into the pre-authored storyline.

Figure 5:
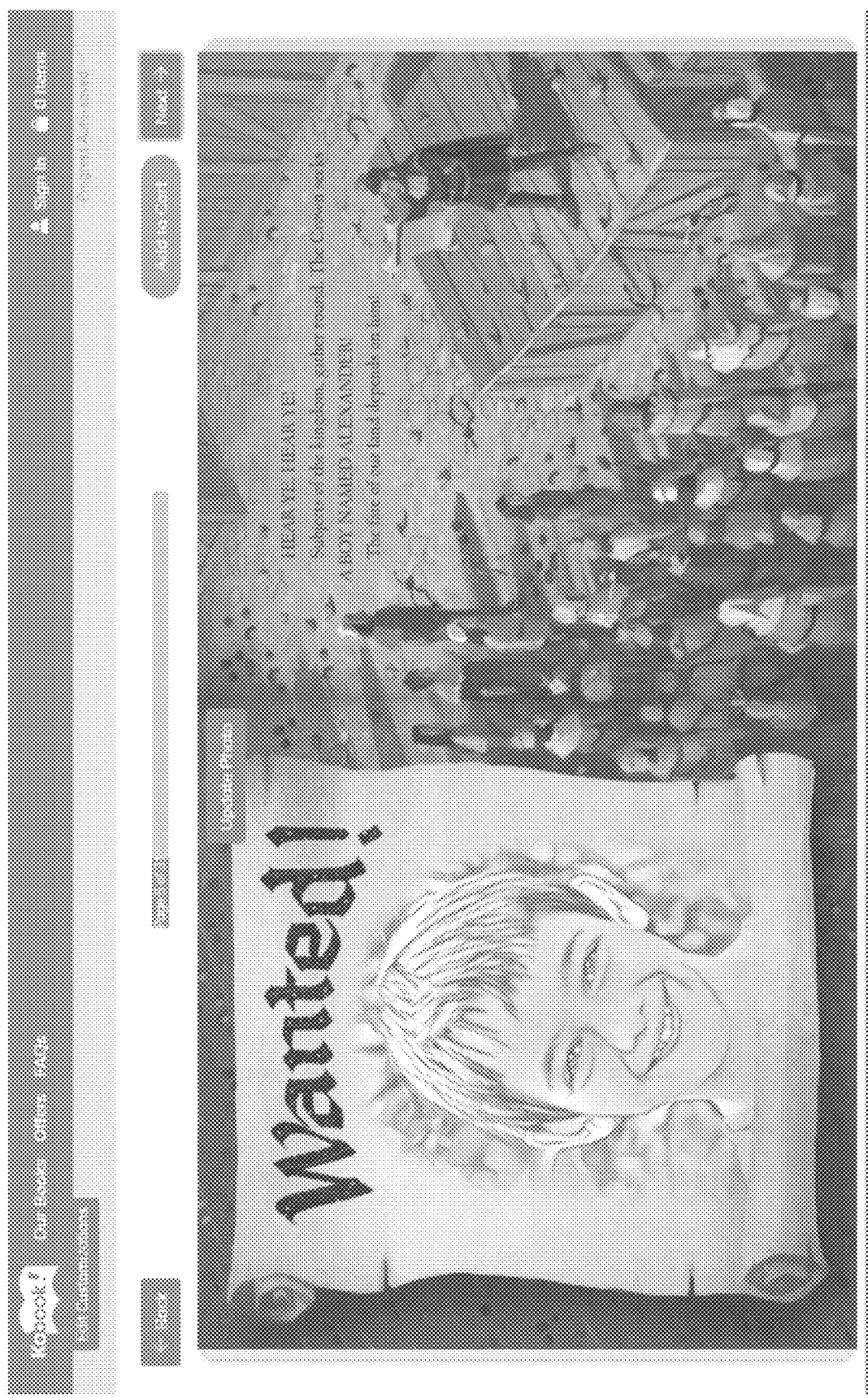
FIG. 5 is a view of the application user interface design and functionality for image treatment consistent with certain embodiments of the present invention.

Turning now to FIG. 5, a view of the application user interface design and functionality for image treatment consistent with certain embodiments of the present invention is shown. In an embodiment, at 500 User is presented with a version of each uploaded photographic image treated to appear as having been drawn by the human hand or as having been painted or otherwise produced. Such treatment can soften the appearance of a photographic image to enhance an emotional connection with a viewer. In a non-limiting example, an image modified to take on a gauzy appearance may invoke thoughts of a dreamlike state, heightening emotional connection and intimacy between the viewer and the subject. In an alternate non-limiting example, the person for whom the book has been personalized may be presented in a wanted poster to strengthen the personal association between the person and the storyline within the personalized book.

Figure 6A:
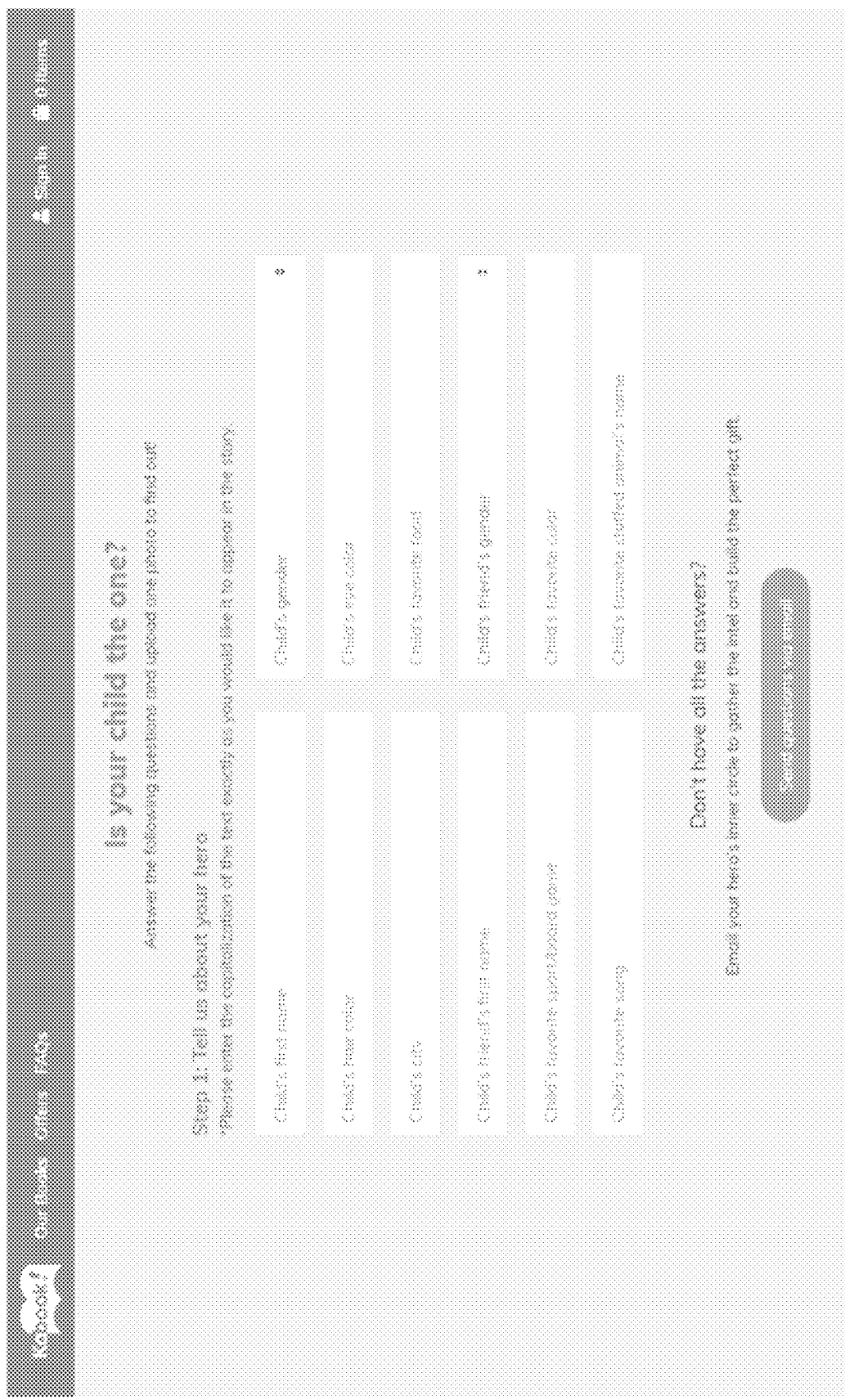
FIG. 6A is a view of the application user interface design and functionality for user text responses consistent with certain embodiments of the present invention.

Turning now to FIG. 6A, a view of the application user interface design and functionality for user text responses consistent with certain embodiments of the present invention is shown. In an embodiment, at 601 the user is provided with one or more text entry fields for the entry of text in response to prompts sent by the storybook system. Text prompts may include requests for the user to enter their name, or another person's name, location information, or any other text necessary to the storyline to complete the customization of the storybook. Upon receipt of the text prompts from the storybook system, the user may enter the requested information into the selected text boxes and indicate when the text entry has been completed. The user interface may then transmit the user entered text information to the storybook system for formatting and inclusion in the customized storyline and presented to the user in the completed customized storybook.

Figure 6B:
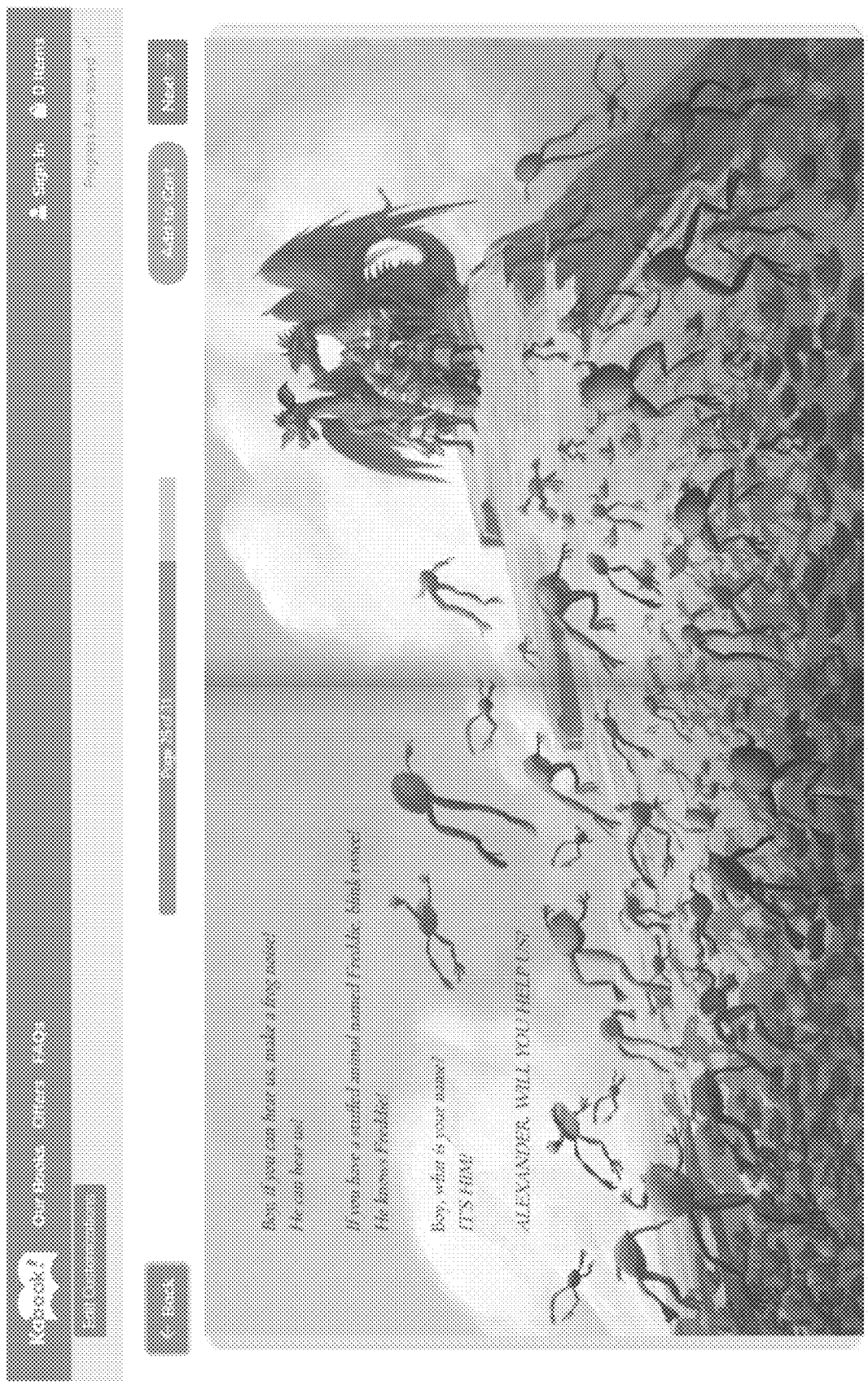
FIG. 6B is a view of the output of a page of the customized storybook is shown consistent with certain embodiments of the present invention.

Turning now to FIG. 6B, a view of the output of a page of the customized storybook consistent with certain embodiments of the present invention is shown. In a non-limiting example, at 602 the text is customized with the name of the user's child and with the name of a favorite stuffed animal associated with the child. The text may also be customized with the names of the child and the favorite stuffed animal becoming involved in the actions represented within the storyline. In conjunction with the filtered photograph illustrated above in FIG. 5, this personalization of illustrations and words with strong emotional attachment to the reader creates a storyline heretofore unavailable to authors and a unique emotional connection to the reader.

While certain illustrative embodiments have been described, it is evident that many alternatives, modifications, permutations and variations will become apparent to those skilled in the art in light of the foregoing description.

We claim:

1. A system that dynamically directs customization of a pre-existing storyline, comprising:
    a server comprising a data processor;
    said server having a user interface;
    a digital application in communication with said server capable of receiving user preferences and communicating with said digital application;
    providing via said digital application and said user interface a menu of pre-authored storylines;
    prompting a user to select one of said pre-authored storylines;
    prompting a user to upload one or more digital images and one or more text blocks to said server;
    transforming within said server the one or more digital images through the application of one or more image filters to create one or more transformed digital images;
    creating said one or more transformed digital images to include augmented reality elements, virtual reality elements, and/or animated elements;
    integrating the one or more transformed digital images and the one or more text blocks into the user-selected pre-existing storyline, creating a customized story where an active neural network determines user preferences for said pre-existing story line and said one or more transformed digital images;
    displaying to user an exemplary digital version of the customized story; and
    delivering to user one or more books embodying said customized story.

2. The system of claim 1, where said digital images are stored in any type of media suitable for storing electronic instructions, including floppy disks, optical disks, CD-ROMs, magnetic-optical disks, read-only memories (ROMs), random access memories (RAMs), EPROMs, EEPROMS, magnetic or optical cards, and application specific integrated circuits (ASICs).

3. The system of claim 2, where the media suitable for storing electronic instructions is electrically coupled to a computer system bus.

4. The system of claim 1, where said digital application is in communication with said server.

5. The system of claim 1, where user uploads are crowdsourced.

6. The system of claim 1, where said one or more digital images are segmented, distributed, and spliced throughout said one or more books.

7. The system of claim 1, where an active neural network determines user preferences.

8. The system of claim 1, where each page of said one or more books includes multiple transformed images.

9. A software based system embodied in a non-transitory computer readable medium performing dynamic customization of a pre-existing storyline, comprising:
    providing via a digital application and associated user interface a menu of pre-authored storylines;
    prompting a user to select one of said pre-authored storylines;
    prompting a user to upload one or more digital images and one or more text blocks to a server;
    the server transforming said one or more digital images and one or more text blocks through the application of one or more image filters;
    said server creating said one or more transformed digital images to include augmented reality elements, virtual reality elements, and/or animated elements;
    integrating the one or more transformed digital images and the one or more text blocks into the user-selected pre-existing storyline to create a customized story where an active neural network determines user preferences for said pre-existing story line and said one or more transformed digital images;
    displaying to a user an exemplary digital version of the customized story; and
    delivering to the user one or more books embodying the customized story.

10. The system of claim 9, where said digital images are stored in any type of media suitable for storing electronic instructions, including floppy disks, optical disks, CD-ROMs, magnetic-optical disks, read-only memories (ROMs), random access memories (RAMs), EPROMs, EEPROMS, magnetic or optical cards, and application specific integrated circuits (ASICs).

11. The system of claim 10, where the media suitable for storing electronic instructions is coupled to a computer system bus.

12. The system of claim 9, where said digital application is in constant or sporadic communication with said server.

13. The system of claim 9, where user uploads are crowd-sourced.

14. The system of claim 9, where said one or more digital images are segmented, distributed, and spliced throughout said one or more books.

15. The system of claim 9, where each page of said one or more books includes multiple transformed images.

* * * * *